United States Patent [19]
Fleck et al.

[11] Patent Number: 5,766,786
[45] Date of Patent: Jun. 16, 1998

[54] METHOD AND SYSTEM FOR METERED SUPPLY OF METHANOL AND/OR WATER TO A FUEL-CELL SYSTEM

[75] Inventors: Wolfram Fleck, Erbach; Norbert Wiesheu, Günzburg; Uwe Benz, Uhldingen, all of Germany

[73] Assignee: Daimler-Benz Aktiengesellschaft, Germany

[21] Appl. No.: 504,493

[22] Filed: Jul. 20, 1995

[30] Foreign Application Priority Data

Jul. 20, 1994 [DE] Germany ............... 44 25 634.5

[51] Int. Cl.$^6$ .................................................. H01M 8/04
[52] U.S. Cl. ............................ 429/17; 429/19; 429/25
[58] Field of Search ........................... 429/22, 25, 13, 429/17, 19, 34

[56] References Cited

U.S. PATENT DOCUMENTS

| | | | |
|---|---|---|---|
| 3,745,047 | 7/1973 | Fanciullo et al. | 429/23 |
| 4,075,396 | 2/1978 | Grehier | 429/17 |
| 4,226,919 | 10/1980 | Stüwe | 429/25 |
| 4,243,731 | 1/1981 | Cheron | 429/13 |
| 4,810,597 | 3/1989 | Kumagai et la. | 429/22 |
| 5,248,566 | 9/1993 | Kumar et al. | 429/19 |
| 5,397,656 | 3/1995 | Morimoto et al. | 429/17 |

FOREIGN PATENT DOCUMENTS

| | | |
|---|---|---|
| 2157722 | 7/1972 | Germany. |
| 2226665 | 12/1973 | Germany. |
| 2639695 | 3/1977 | Germany. |
| 2947288 | 6/1980 | Germany. |
| 3508153 | 9/1985 | Germany. |

*Primary Examiner*—Kathryn L. Gorgos
*Assistant Examiner*—William T. Leader
*Attorney, Agent, or Firm*—Evenson, McKeown, Edwards & Lenahan, P.L.L.C.

[57] ABSTRACT

A method and a system meters a supply of methanol and/or water out of a storage reservoir to a fuel-cell system by way of a conveying conduit with a metering valve. A constant mass flow is conveyed out of the storage reservoir into the conveying conduit via a conveying pump. The differential pressure between the conveying conduit and fuel-cell system is set at a predetermined value via a differential-pressure controller which is arranged in a return conduit provided between the conveying conduit and storage reservoir. The methanol and/or water supplied can be set, for example, by varying the opening and closing times of a solenoid valve. A second metering stage can be provided in the return conduit downstream of the first metering stage. When two separate metering systems are used, a common pump motor can be employed.

10 Claims, 1 Drawing Sheet

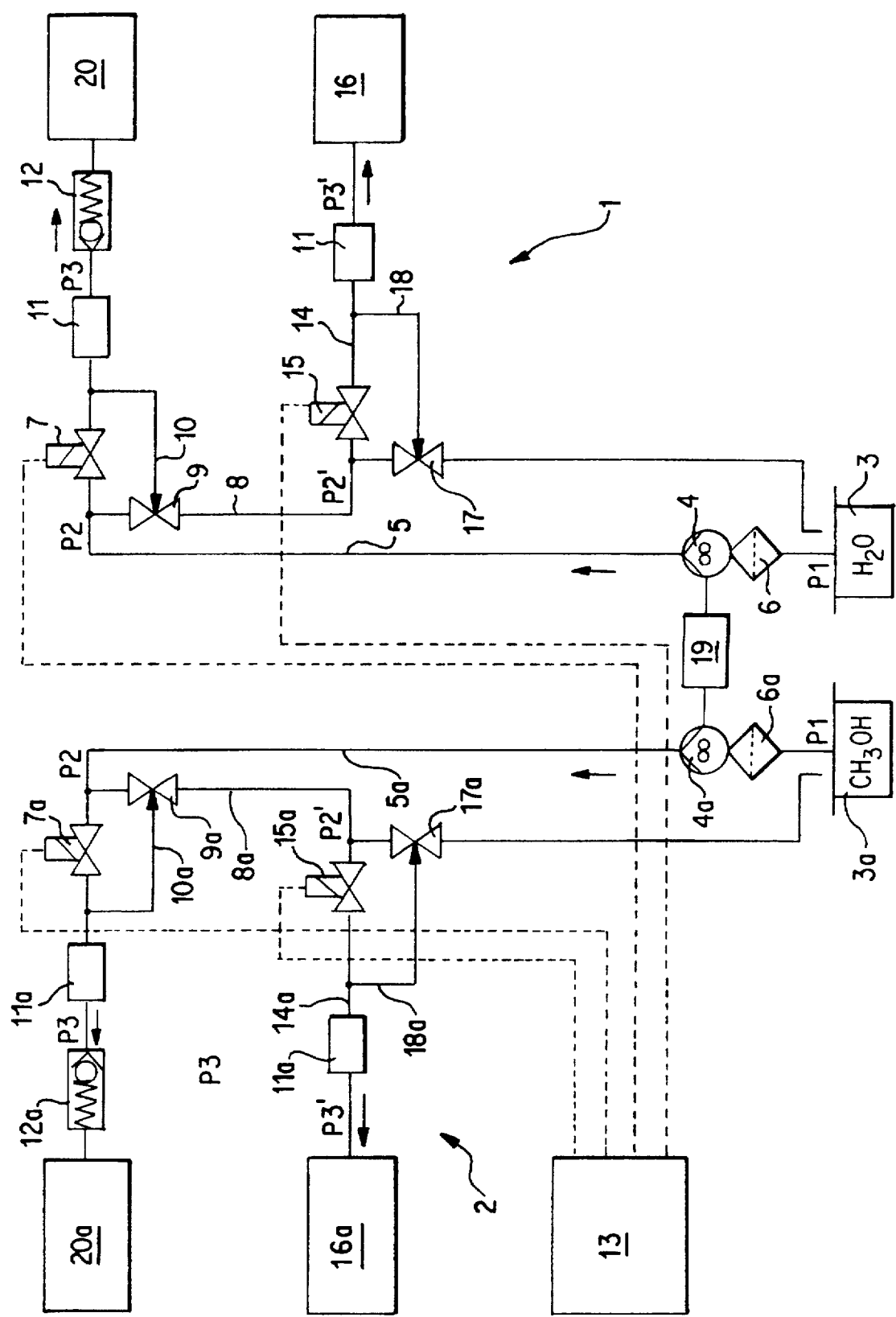

METHOD AND SYSTEM FOR METERED SUPPLY OF METHANOL AND/OR WATER TO A FUEL-CELL SYSTEM

BACKGROUND AND SUMMARY OF THE INVENTION

The present invention relates to a method and a system for the metered supply of methanol and/or water out of a storage reservoir to a fuel-cell system via a conveying conduit and a conveying pump.

To operate fuel cells having proton-conducting electrolytic membranes, referred to below as PEM fuel cells, for mobile use, hydrogen is generated from methanol by water-vapor reforming and/or by partial oxidation. In both processes, the conveyance and metering of the liquid reactants is necessary. On the one hand, methanol and/or water must be metered into the evaporator. On the other hand, to provide process heat, the methanol has to be metered for subsequent combustion. Moreover, the process air provided must always be sufficiently humidified. Particularly in dynamic operating states, the water must be metered to the air quantity required, in such a way that a desired relative humidity is always established.

U.S. Pat. No. 5,248,566 discloses a fuel cell with a reformer for a motor vehicle, in which water, air and a fuel, for example methanol, are supplied to the reformer by way of a conveying conduit. The conveyance and metering of the water and methanol conventionally take place via metering pumps. However, in a complex fuel-cell system, a multiplicity of such metering pumps could be required.

Moreover, in the case of PEM fuel cells, it is also necessary for the process air to be sufficiently humidified. The humidification of the process air can be brought about, for example, via moist membrane walls. However, this method does not allow for the dynamic operation of the fuel-cell system to a sufficient extent.

Furthermore, German Patent Application No. DE 3,508,153 discloses a fuel-cell system, in which a methanol/water mixture is supplied from a tank. To set a predetermined methanol concentration, methanol is additionally added in a metered manner via a flow controller.

The object of the invention is to provide a method and a system for the metered supply of liquid reactants to a fuel-cell system, which guarantees very good dynamics in the event of load changes, exact metering under variable system pressure and compact construction.

The advantage of the system according to the invention is that a standard metering system can be used to supply all reactants. The reactant is supplied to a closed circuit, consisting of a conveying and a return conduit, from a storage reservoir via a conveying pump. The metering of the reactant to the fuel-cell system then takes place via metering valves, the differential pressure being set on the metering valve via a differential-pressure controller. In this case, the metering can take place in a simple way by setting the opening or closing times of the metering valve.

A further advantage is that a plurality of components of the fuel-cell system can be fed via a common metering system. Components with a decreasing system pressure are arranged one behind the other in the direction of flow. Although the system pressure varies within wide ranges, the required differential pressure can nevertheless be set at each of the metering points via the associated differential-pressure controller. During operation, each metering valve can be activated individually via a control unit. Finally, it is also possible to operate a plurality of metering systems, for example one for the methanol and one for the supply of high-purity water, via a common pump motor, thus leading to a considerable saving in the cost of parts and therefore also a reduction in the space required for the system.

Other objects, advantages and novel features of the present invention will become apparent from the following detailed description of the invention when considered in conjunction with the accompanying drawing.

BRIEF DESCRIPTION OF THE DRAWINGS

The FIGURE is a schematic showing an arrangement for a proton-conducting electrolytic membrane fuel-cell system.

DETAILED DESCRIPTION OF THE PREFERRED EMBODIMENT

The two metering systems 1, 2 serve respectively for the supply of high-purity water and methanol to individual components of a PEM fuel-cell system. In one metering system 1, the high-purity water is conveyed out of a storage reservoir 3 into a conveying conduit 5 via a conveying pump 4. A filter 6 can be provided for purifying the high-purity water between the storage reservoir 3 and conveying pump 4. A metering valve 7 is arranged in the conveying conduit 5 between the conveying pump 4 and the first component 20 of the fuel-cell system. Upstream of the metering valve 7, a return conduit 8, which returns the excess high-purity water for the next use or into the storage reservoir 3, branches off from the conveying conduit 5.

In the return conduit 8 a differential-pressure controller 9 is provided which is additionally connected to the conveying conduit 5 via a control conduit 10 upstream of the metering valve 7. To reduce vibrations which may be caused by pumping or by fluctuating system pressures in the conveying conduit 5, a pulsation damper 11 can be arranged in the conveying conduit 5 downstream of the branch-off of the control conduit 10. Moreover, to prevent high-purity water from passing in the pressureless state into the first component 20 of the fuel-cell system, a non-return valve 12 can also be used.

A conveying pump 4, for example, a gear pump with stable conveying characteristics, can be used which delivers a fixed mass flow of high-purity water with a relatively constant pressure difference between the suction side P1 and the delivery side P2. The conveying pump 4 is set in such a way that a sufficiently large controlled quantity of high-purity water is available for the differential-pressure controller 9. The differential-pressure controller 9 regulates the pressure difference between the pressure P2 in the conveying conduit 5 and the system pressure P3 in the first component 20 of the fuel-cell system to a constant value where $\Delta P1=P3-P2$. For this purpose, for example, a mechanical differential-pressure controller 9 can be used. However, in the case of load changes, the system pressure P3 can fluctuate sharply. The differential pressure $\Delta P1$ at the metering valve 7 is regulated such that the quantity of high-purity water, which is returned to the storage reservoir 3 via the return conduit, is set as a function of the system pressure P3 in the first component 20 of the fuel-cell system via the differential-pressure controller 9. For this purpose, the differential-pressure controller 9 is loaded with the system pressure P3 via the control conduit 10.

Since the metering valve 7 is thus operated with a constant pressure gradient, the metering of the quantity of high-purity water can take place by controlling the opening and closing times of the metering valve 7. For this purpose, the metering valve 7, which is preferably designed as a clocked solenoid metering valve, is connected to a control unit 13 which presets the quantity of high-purity water as a function of the operating parameters of the fuel-cell system. Thus, a metering system can be provided, which, despite variable system pressure, guarantees exact metering and very good dynamic behavior.

In the design of the metering system 1, the characteristic frequencies of the differential-pressure controller 9, of the vibration damper 11, and of the metering valve 7 and the clock frequency of the metering valve 7 are coordinated with one another. Moreover, the fuel-cell components, into which the high-purity water has to be introduced in atomized form, can be made by integrating the valve and the atomizing system in one part, for example in the form of known injection nozzles.

If, in a fuel-cell system, it is necessary to supply high-purity water to different components at varying pressure levels, the metering system 1 can be of two-stage design. For this purpose, downstream of the differential-pressure controller 9, a second conveying conduit 14, is provided in which a second metering valve 15 is connected to the control unit 13, and branches off from the return conduit 8. In addition, a pulsation damper 11 can once again be arranged between the second metering valve 15 and the second component 16 of the fuel-cell system. To regulate the differential pressure ΔP2=P3'-P2' between the pressure P2' in the return conduit 8 and the system pressure P3' in the second component 16 of the fuel-cell system, a second differential-pressure controller 17, is arranged downstream of the branch-off of the second conveying conduit 14, and is connected to the metering valve 15 via a control conduit 18.

Since the return of the first stage serves at the same time as a feed for the second stage, the second stage can be operated only at a lower pressure level such that P2'<P2. However, this does not constitute a restriction since, in PEM fuel cells, the metering of water for water-vapor reforming of methanol takes place at a higher pressure level than the metering of high-purity water for humidifying the process air. Thus, in the embodiment described, the first component 20 corresponds to the methanol reformer or the associated evaporator and the second component 16 to the humidifier unit for the process air.

As a further reactant, for example, methanol is supplied to the fuel-cell system. For the metering of liquid methanol, there are once again two areas of use. On the one hand, the methanol is supplied to a reformer or to an associated evaporator. On the other hand, the methanol can be supplied to a catalytic burner for process heat. Since the same requirements apply to these uses as to the high-purity water system, namely exact metering and good dynamics under a variable pressure system, the same technique described above can be employed. Another advantage here is that the quantity of methanol metered for the reforming process is significantly higher than the quantity of methanol metered for the catalytic burner. Thus, the metering unit for the catalytic burner can once again be arranged in series with the metering unit for the reformer or with the associated evaporator.

To distinguish between the two metering systems 1, 2, the reference symbols of the further metering system 2 are provided with the suffix a. In principle, however, these are identical arrangements. The differences are merely that, in the further metering system 2, the storage reservoir 3a contains liquid methanol, and that, as the second component of the fuel-cell system, the catalytic burner 16a is supplied with methanol. As a result of the standardization of the two metering systems 1, 2, the number of parts used can be reduced and therefore the cost of the system reduced. The activation of the metering valves 7, 7a, 15, 15a preferably takes place via a common control unit 13. It is also possible, however, to activate the individual metering valves 7, 7a, 15, 15a via separate control units.

With mobile use, as space is very limited, it may also be advantageous if a common pump motor 19 having two free shaft ends is used for driving the two conveying pumps 4, 4a. Thus, the pump motor 19 has one motor bearing carrying the pump head 4 for the first metering system 1, and one motor bearing carrying the pump head 4a for the further metering system 2. The pump heads 4, 4a are set in such a way such that a sufficiently large controlled quantity of high-purity water and methanol is provided for the respective differential-pressure controllers 9, 17 and 9a, 17a.

The activation of each metering valve 7, 15, 7a, 15a can be carried out individually via the control unit 13. Thus, for example, the quantity of high-purity water for the water-vapor reforming can be metered as a function of the methanol quantity and other influencing variables. The methanol quantity can in turn be metered as a function of the hydrogen quantity required. Finally, the quantity of high-purity water for the humidifier unit 16 or the methanol quantity for the catalytic burner 16a can be set, for example, as a function of the mass air flow.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for the metered supply of a liquid reactant out of a storage reservoir to a fuel-cell system by way of a conveying conduit via a conveying pump, comprising a primary metering system wherein a primary metering valve is arranged in a primary conveying conduit between a conveying pump, which pumps liquid reactant out of the storage reservoir, and a primary component of the fuel-cell system, wherein, upstream of the primary metering valve, a return conduit, which returns excess liquid reactant to the storage reservoir, branches off from the primary conveying conduit, and wherein a primary differential-pressure controller, which sets the pressure difference between the primary conveying conduit upstream of the primary metering valve and the primary component of the fuel-cell system at a preselected value, is arranged in the return conduit.

2. The system according to claim 1, comprising a secondary metering system wherein a secondary conveying conduit having a secondary metering valve, through which the liquid reactant is supplied to a secondary component of the fuel-cell system, branches off from the return conduit, and wherein a secondary differential-pressure controller, which sets the pressure difference between the secondary conveying conduit upstream of the secondary metering valve and the secondary component of the fuel-cell system at a preselected value, is arranged in the return conduit downstream of the branch-off of the secondary conveying conduit.

3. The system according to claim 2, wherein the storage reservoir is adapted to supply methanol as the liquid reactant and the primary component of the fuel-cell system is either a gas generating system or an evaporator, and the secondary component is a system for generating heat energy by the combustion of methanol, and the methanol is supplied through the primary metering valve to the gas generating system or evaporator and, through the secondary metering valve, to the system for generating heat energy by the combustion of the methanol.

4. The system according to claim 2, wherein the storage reservoir is adapted to supply water as the liquid reactant and the primary component of the fuel-cell system is either a gas generating system or an evaporator, and the secondary component is a system for humidifying oxidant, and the water is supplied through the primary metering valve to the gas generating system or evaporator and, through the secondary metering valve, to the system for humidifying the oxidant.

5. The system according to claim 2, wherein the metering valves are solenoid valves with variable opening and closing times.

6. The system according to claim 5, wherein a control unit is operatively associated with the solenoid valves for setting the opening and closing times of the solenoid valves.

7. The system according to claim 2, wherein a first primary and secondary system is provided for a first reactant and a second primary and secondary system is provided for a second reactant.

8. The system according to claim 1, wherein a first primary metering system is provided for a first reactant and a second primary metering system is provided for a second reactant.

9. The system according to claim 8, wherein a second conveying pump is provided for the second primary metering system and a common pump motor drives the conveying pumps for the first and second metering systems.

10. A system for the metered supply of a liquid reactant out of a storage reservoir to a fuel-cell system by way of a conveying conduit via a conveying pump, comprising at least one metering system wherein a metering valve is arranged in a conveying conduit between a conveying pump, which pumps liquid reactant out of the storage reservoir, and a component of the fuel-cell system, wherein, upstream of the metering valve, a return conduit, which returns excess liquid reactant to the storage reservoir, branches off from the conveying conduit, and wherein a differential-pressure controller, which sets the pressure difference between the conveying conduit upstream of the metering valve and the component of the fuel-cell system at a preselected value, is arranged in the return conduit.

* * * * *